United States Statutory Invention Registration [19]

[11] Reg. Number: H3

Yachnis [45] Published: Dec. 3, 1985

[54] ORIGINAL METHOD OF DRYDOCKING SHIPS

[75] Inventor: Michael Yachnis, Washington, D.C.

[73] Assignee: The United States of America, Washington, D.C.

[21] Appl. No.: 731,700

[22] Filed: May 8, 1985

[51] Int. Cl.[4] ..... B63C 3/06

[52] U.S. Cl. ..... 405/3; 405/2; 405/1; 114/44

[56] References Cited

U.S. PATENT DOCUMENTS 3,252,589 5/1966 Keene et al. ..... 414/560

*Primary Examiner*—David H. Brown

*Attorney, Agent, or Firm*—Robert F. Beers; William T. Ellis; Ansel M. Schwartz

[57] ABSTRACT

An apparatus for moving a large ship from water to a pre-determined area for repair thereof comprising: lifting means for lifting the ship out of the water; guidance means to guide the ship while it is on the lifting means to the pre-determined repair area; and means for enabling the lifting means to be emplaced on the ship; said enabling means having an entrance.

8 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ORIGINAL METHOD OF DRYDOCKING SHIPS

BACKGROUND OF THE INVENTION

The present invention is related to drydocks for the repair of ships. More specifically, the present invention relates to drydocks that are simple to maintain and are inexpensive.

Drydocks are used to repair ships. The five conventional methods of docking ships are:

(1) graving docks, (2) floating drydocks, (3) marine railways, (4) vertical lifts, and (5) travel lifts on rubber wheels.

A graving dock is a fixed basin constructed of reinforced concrete or granite walls and floors. With the use of steel or concrete gates (caissons), the basins can be dewatered to accommodate a ship to be repaired in dry conditions. The problem with graving docks is that the excavation in the construction of graving docks are expensive, time consuming, and complex, particularly in seismic areas. The flooding, dewatering, and drainage systems including the pump house are expensive to construct and difficult to operate and maintain. Entrance of a ship into a graving dock is extremely difficult. It requires detailed elaborate procedures, the experience of a certified dock master, and the assistance of a large crew. The flooding and dewatering process are time consuming.

Floating docks are essentially floating basins constructed of reinforced concrete or steel which can be flooded or dewatered to receive a ship to be repaired in dry condition. The disadvantage of floating drydocks is that special attention is required to the stability of this system and the selection of the appropriate mooring system. Except for the excavation, the limitations and disadvantages of these drydocks are similar to the graving docks.

A marine railway is an inclined plane system in gear hauling machinery which is able to pull a cradle and a ship out of the water. The disadvantage of marine railways are that these systems are limited to small classes of ships. (Approximately 5,000 long tons maximum loading capacity). They are more subject to mishap than other docking facilities and vulnerable to earthquake forces. Since they are made of structural steel and are exposed to the salt water environment, they are subjected to severe corrosion.

A vertical lift is an elevator system which lifts the ship vertically out of the water. The problem with vertical lifts are that they have limited lifting capacity, are vulnerable to earthquake forces and are very expensive to build.

Lastly, a travel lift on rubber wheels is a steel frame system with a hoist with small lifting capacity. The problem with travel lifts on rubber wheels for small boats, is that they are very limited in their lifting capacity and are used for only small pleasure boats.

SUMMARY OF THE INVENTION

Accordingly, one object of this invention is to provide a novel drydock which eliminates the need for pump houses and expensive flooding, dewatering, and drainage systems.

Another object of this invention is to provide a novel drydock that eliminates the possibility of accidental catastrophic flooding.

Another object of this invention is to provide a novel drydock wherein a ship is repaired on ground level in open space which facilitates operations, minimizes cost, and provides adequate ventilation.

Yet another object of this invention is to provide a novel drydock that eliminates geotechnical problems; eliminates excavations, structural, electrical and mechanical components and systems in seismic and non-seismic areas; and eliminates leaking floors and walls.

Another object of this invention is to provide a novel drylock where expensive maintainence is eliminated.

Another object of this invention is to provide a novel drylock that uses gantry cranes to lift a ship to be repaired as well as to be used in other activities around the drydock.

Another object of this invention is to provide a novel drydock that can accomodate a number of ships in consecutive order and which can be repaired simultaneously upon the availability of surrounding space.

These and other objects are achieved with an apparatus for moving a large ship from water to a predetermined area for repair thereof comprising: lifting means for lifting the ship out of the water; guidance means for guiding the ship to the predetermined repair area while it is on the lifting means; and means for enabling the lifting means to be emplaced on the ship. The enabling means has an entrance.

The above described apparatus is utilized to move a large ship from water to a predetermined area for repair thereof with the following the steps of: moving the ship into a slip; lifting a ship out of the water so it is suspended in the air; guiding the ship to the predetermined area for repair; and setting down the ship in the predetermined area for repair.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
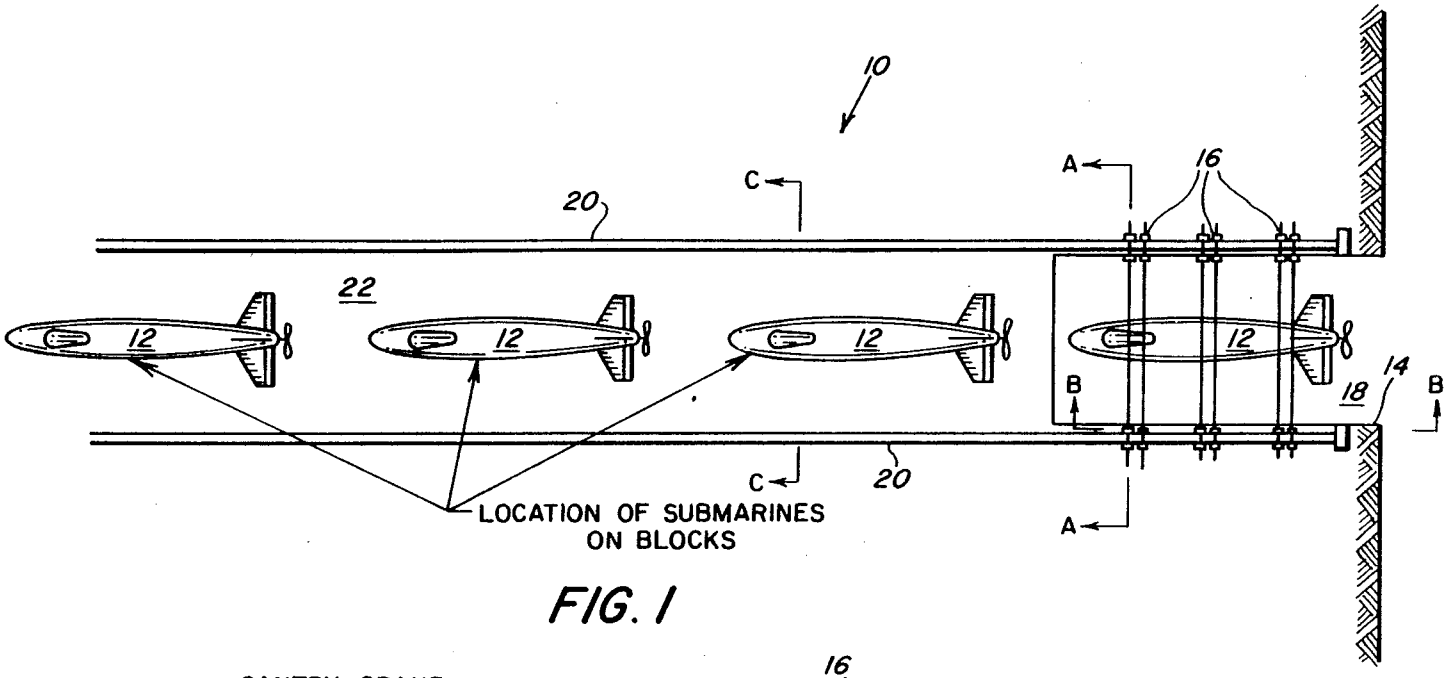
FIG. 1 is a top view of one embodiment of the drylock of the present invention.

Referring now to the drawings, wherein like reference numerals designate identical or corresponding parts throughout the several views, and more particularly to FIG. 1 thereof, a drydock 10 with submarines 12 in drydock 10 is illustrated. Drydock 10 is comprised of a channel entrance 14, gantry cranes 16, a slip 18, crane rail tracks 20, and a predetermined repair area 22.

In the operation of the drydock 10, a submarine 12 enters the slip 18 through the channel entrance 14. The gantry crane 16 lifts the submarine 12 out of the slip 18 and then moves the submarine 12 to predetermined repair location 22. The gantry crane 16, while holding the submarine 12, is guided by the two crane rail tracks 20 to the predetermined repair area 22.

Figure 2:
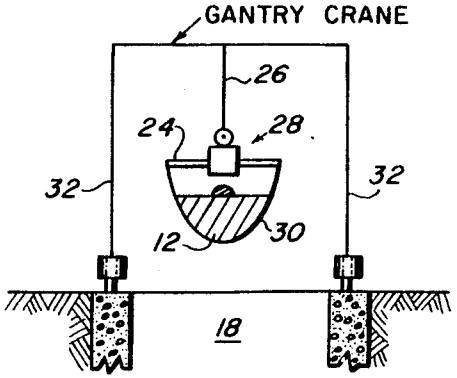
FIG. 2 is a cross-sectional view taken at section A—A of the embodiment of FIG. 1.

A more detailed illustration of how the gantry crane 16 lifts the submarine 12 out of the slip 18 is shown in FIG. 2. FIG. 2 is a cross-sectional view of drydock 10 taken at section A—A of FIG. 1. FIG. 2 shows the submarine 12 suspended over the slip 18 after it has been lifted out of the slip 18 by the gantry crane 16. A holding means or system 24 that is connected to the gantry crane 16 is what submarine 12 rests on and is supported by as it is lifted and moved by the gantry crane 16.

The holding system 24 is comprised of a cable 26, a stabilizer 28 and a lifting belt 30. The cable 26 is attached to the stabilizer assembly and the top of the gantry crane, and runs therebetween. The cable connections to the stabilizer assembly 28 and the gantry crane 12 is well known in the art. (Crane 12 and stabilizer assembly 28 manufacturers which can provide said components are Whiting Corp. of Harvey, Ill., P & H Cranes of Milwarkee, Ill., and American Hoist & Derrick of St. Paul, Mi.). The lifting belt 30 slides under the submarine 12. (Lifting belt 30 manufacturers which can provide said belts are Liftox Sling, Inc. of Huntington Valley, Pa., Caldwell Co. of Rockford, Ill., and Cambridge Wire Cloth Co. of Cambridge, Md. The submarine 12 directly rests upon the lifting belt 30 with one end of the belt 30 being located on the port side of the submarine 12 and one end of the belt being located on the starboard side of the submarine 12. The stabilizer assembly 28 is attached to and links the two ends of the lifting belt. The lifting belt 30 forms a closed loop around the submarine 12 with the stabilizer assembly 28.

Figure 3:
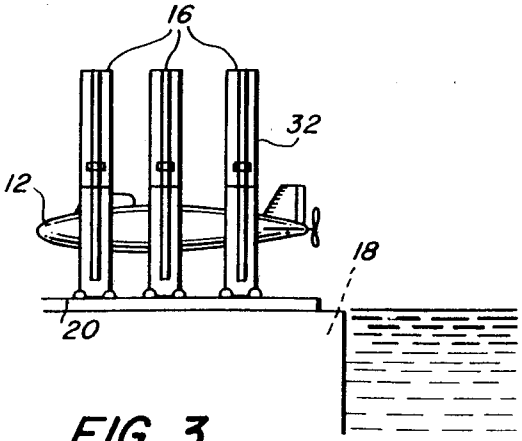
FIG. 3 is a side view of the present drydock taken at section B—B of the embodiment of FIG. 1.

After the submarine 12 is lifted out of the slip 18, it is moved to the predetermined repair area 22 along crane rail tracks 20 as shown in FIG. 3.

FIG. 3 is a side view of the drydock taken at section B—B of FIG. 1. As FIG. 3 illustrates, after the lifting system 24 has been emplaced on the submarine 12 and the gantry crane 16 has lifted the submarine 12 out of the slip 18, the gantry crane with the submarine suspended from it is guided along the crane rails 20 to the predetermined repair area 22 shown in FIG. 1. The two crane rail tracks are parallel to each other with one crane rail track located on each side of the slip and running from the entrance 14 of the slip 18 into the repair area 22 as shown in FIG. 1. The gantry crane 16 has two legs 32 which straddle the crane rail tracks 20. The repair area 22 and the slip 18 are located between the crane rail tracks 20.

Figure 4:
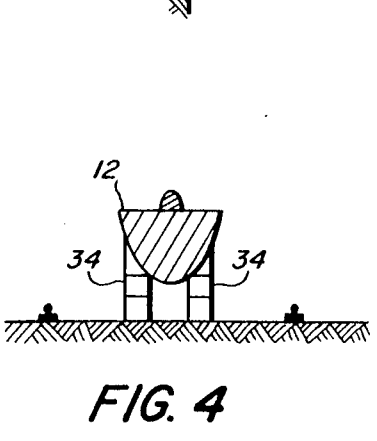
FIG. 4 is a front view of the present drydock taken at section C—C of the embodiment of FIG. 1.

The submarine 12 is set down and released from the gantry crane 16 and the holding system 24 on the blocks 34 in a predetermined repair area as shown in FIG. 4. FIG. 4 is a cross-section view C—C of FIG. 1 and shows a submarine 12 in a position to be worked on and repaired.

As FIGS. 1 and 3 show, more than one gantry crane 16 may be used. The number of gantry cranes 16 used depends on how heavy the ship being lifted is and how much balance the ship needs to be afforded. By way of example only, the ship identified is a submarine. However, the drydock presented here is not limited to submarines and may handle a ship such as an aircraft carrier, a battleship, a destroyer, etc. FIG. 1 also illustrates that more than one ship can be placed into the repair area, depending on the space available.

When the gantry crane is not used to lift ships, it can revert back to its prior art uses of aiding in the repair of the ships.

The present drydock thus eliminates the use of pump houses and expensive flooding, dewatering, and drainage systems since the ship to be repaired is lifted onto dry land and no water has to be displaced. Having the ship repaired on dry land above relative sea level eliminates accidental catastrophic flooding due to the fact that no doors or walls keeping water out of the drydock area can fail.

The ship is repaired on ground level and open space which facilitates operations with easy access, minimizes cost for access and drydock maintainence, and provides adequate ventilation.

Lastly, geotechnical problems and excavations, structural, electrical and mechanical components and systems in seismic and non-seismic areas, and leaking floors are eliminated with the present drydock.

Obviously, numerous (additional) modifications and variations of the present invention are possible in light of the above teachings. It is therefore to be understood that within the scope of the appended claims, the invention may be practiced otherwise than as specifically described herein.

What is claimed and desired to be secured by letters patent of the United States is:

1. An apparatus for moving a large ship from water to a predetermined area for repair thereof comprising:

at least one gantry crane;

at least one holding means for holding the ship on as it is lifted by the gantry crane out of the water, said holding means being attached to said gantry crane;

guidance means to guide the ship while it is on the gantry crane to the predetermined repair area; and means for enabling the holding means to be emplaced on the ship, said enabling means having an entrance.

2. An apparatus as described in claim 1, wherein the guidance means is two crane rail tracks parallel to each other with one crane rail track located on each side of the enabling means and running from the entrance of the enabling means into the repair area.

3. An apparatus as described in claim 1, wherein the enabling means is a slip.

4. An apparatus as described in claim 2, wherein the holding means is a lifting belt with two ends that slides under the ship and which the ship directly rests upon, one end of the belt being located on the port side of the ship and one end of the belt being located on the starboard side of the ship;

a stabilizer assembly that links the two ends of the lifting belt and which forms a closed loop around the ship with the lifting belt;

and at least one cable attached to the stabilizer assembly and the top of the gantry crane, and running therebetween.

5. An apparatus as described in claim 1, wherein the gantry crane has two legs and wherein the enabling means is a slip; and wherein the guidance means is two crane rail tracks parallel to each other with one crane rail track located on each side of the slip and running from the entrance of the slip into the repair location, said gantry crane legs being attached to said crane rail tracks with one gantry crane leg being attached to one crane rail.

6. An apparatus as described in claim 5 wherein the holding means is a lifting belt with two ends that slides under the ship and which the ship directly rests upon, one end of the belt being located on the port side of the ship and one end of the belt being located on the starboard side of the ship;

a stabilizer assembly that links the two ends of the lifting belt and which forms a closed loop around the ship with the lifting belt; and at least one cable attached to the stabilizer assembly and the top of the gantry crane, and running therebetween.

7. A method for moving a large ship from water to a predetermined area for repair thereof comprising the steps of:

moving the ship into a slip;

placing at least one lifting belt under the ship;

attaching the belt to at least one gantry crane;

lifting the ship out of the water with the gantry crane;

guiding the gantry crane with the ship hanging from it along gantry crane rail tracks to the predetermined repair area; and setting down the ship from the gantry crane and releasing it in the predetermined repair area.

8. An apparatus for moving a large ship from water to a predetermined are for repair thereof comprising:

at least one gantry crane;

at least one holding means for holding the ship on as it is lifted by the gantry crane out of the water, said holding means being attached to said gantry crane;

a slip for enabling the holding means to be emplaced on the ship, said slip having an entrance;

two crane rail tracks parallel to each other with one crane rail track located on each side of the slip and running from the entrance of the slip into the repair area.

* * * * *